(12) United States Patent
Lee et al.

(10) Patent No.: US 10,247,981 B2
(45) Date of Patent: Apr. 2, 2019

(54) REFLECTIVE LIQUID CRYSTAL DISPLAY DEVICE

(71) Applicant: SAMSUNG DISPLAY CO., LTD., Yongin-si (KR)

(72) Inventors: Gakseok Lee, Hwaseong-si (KR); Sunyoung Kwon, Seoul (KR); Taehoon Kim, Suwon-si (KR); Jihong Bae, Yongin-si (KR); Jieun Jang, Suwon-si (KR)

(73) Assignee: SAMSUNG DISPLAY CO., LTD., Gyeonggi-Do (KR)

( * ) Notice: Subject to any disclaimer, the term of this patent is extended or adjusted under 35 U.S.C. 154(b) by 0 days.

(21) Appl. No.: 15/723,925

(22) Filed: Oct. 3, 2017

(65) Prior Publication Data

US 2018/0095327 A1    Apr. 5, 2018

(30) Foreign Application Priority Data

Oct. 4, 2016  (KR) .......................... 10-2016-0127559

(51) Int. Cl.

| G02F 1/1335 | (2006.01) |
|---|---|
| G02F 1/135 | (2006.01) |
| G02F 1/137 | (2006.01) |
| G02F 2/02 | (2006.01) |
| G02F 1/13363 | (2006.01) |

(52) U.S. Cl.
CPC .... *G02F 1/133553* (2013.01); *G02F 1/13718* (2013.01); *G02F 1/133528* (2013.01); *G02F 1/133617* (2013.01); *G02F 2/02* (2013.01); *G02F 1/133621* (2013.01); *G02F 2001/1351* (2013.01); *G02F 2001/133638* (2013.01); *G02F 2201/343* (2013.01); *G02F 2203/02* (2013.01)

(58) Field of Classification Search
CPC ........................ G02F 2201/343; G02F 2203/02
See application file for complete search history.

(56) References Cited

U.S. PATENT DOCUMENTS

| 5,889,570 | A | * | 3/1999 | Mitsui | ............... G02F 1/133504 |
|---|---|---|---|---|---|
|  |  |  |  |  | 349/112 |
| 6,068,750 | A | * | 5/2000 | Rasmussen | ........... G03F 7/0007 |
|  |  |  |  |  | 204/490 |
| 2005/0174317 | A1 | * | 8/2005 | Izumi | .................. G02F 1/13718 |
|  |  |  |  |  | 345/101 |
| 2008/0055515 | A1 |  | 3/2008 | Ha et al. |  |
| 2010/0265692 | A1 |  | 10/2010 | Willemsen et al. |  |

(Continued)

FOREIGN PATENT DOCUMENTS

| KR | 101540043 | 7/2015 |
|---|---|---|
| KR | 101614108 | 4/2016 |
| KR | 101636052 | 7/2016 |

*Primary Examiner* — Alexander P Gross
(74) *Attorney, Agent, or Firm* — Cantor Colburn LLP

(57) ABSTRACT

A reflective liquid crystal display device includes a first substrate on which a plurality of pixel areas are defined, a second substrate facing the first substrate, a cholesteric liquid crystal ("CLC") layer between the first substrate and the second substrate, a linear polarization member on the second substrate, a retardation member between the linear polarization member and the CLC layer, a light absorbing layer on the first substrate, and a light conversion member corresponding to the pixel area and interposed between the CLC layer and the light absorbing layer.

16 Claims, 12 Drawing Sheets

(56) References Cited

U.S. PATENT DOCUMENTS

2012/0013972 A1\* 1/2012 Gibson ............. G02F 1/133514
 359/296
2015/0253473 A1\* 9/2015 Liu ................... G02F 1/133533
 359/884

\* cited by examiner

REFLECTIVE LIQUID CRYSTAL DISPLAY DEVICE

This application claims priority to Korean Patent Application No. 10-2016-0127559, filed on Oct. 4, 2016, and all the benefits accruing therefrom under 35 U.S.C. § 119, the content of which in its entirety is herein incorporated by reference.

FIELD

Exemplary embodiments of the invention relate to a reflective liquid crystal display ("LCD") device including a light conversion layer that emits light by an external light.

DISCUSSION OF RELATED ART

With a development of image technology in recent times, a technique for a display device that displays an image on an outside is also developing. In particular, with a spread of portable devices, there is a growing interest in indoor-outdoor display devices. In a current market, various display devices such as a liquid crystal display ("LCD") device, an organic light emitting diode ("OLED") display device, an active mode organic light emitting diode ("AMOLED") display device and in-plane switching ("IPS") mode display device are in use.

SUMMARY

Some panels having excellent image quality indoors may have an issue of degraded visibility outdoors due to reflected light. Further, a reflective display device suitable for outdoor use has a problem of degraded visibility because the amount of reflected light varies depending on the direction of the external light.

Exemplary embodiments of the invention may be directed to a reflective display device excellent in color expression and visibility.

According to an exemplary embodiment, a reflective liquid crystal display device includes a first substrate on which a plurality of pixel areas are defined, a second substrate facing the first substrate, a cholesteric liquid crystal ("CLC") layer between the first substrate and the second substrate, a linear polarization member on the second substrate, a retardation member between the linear polarization member and the CLC layer, a light absorbing layer on the first substrate, and a light conversion member corresponding to a pixel area of the plurality of pixel areas and interposed between the CLC layer and the light absorbing layer.

In an exemplary embodiment, the retardation member may be a quarter wave retardation plate.

In an exemplary embodiment, the CLC layer may selectively reflect a first blue light having a wavelength range from about 400 nanometers (nm) to about 500 nm in a planar state.

In an exemplary embodiment, the CLC layer may transmit a first blue light having a wavelength range from about 400 nm to about 500 nm, a first green light having a wavelength range from about 500 nm to about 570 nm and a first red light having a wavelength range from about 620 nm to about 750 nm that are incident thereto in a homeotropic state. The light conversion member may include a first light conversion member in a blue pixel area of the plurality of pixel areas, the first light conversion member excited by the first blue light to emit a second blue light, a second light conversion member in a green pixel area of the plurality of pixel areas, the second light conversion member excited by the first blue light to emit a second green light, and a third light conversion member in a red pixel area of the plurality of pixel areas, the third light conversion member excited by the first blue light to emit a second red light.

In an exemplary embodiment, the first, second and third light conversion members may include at least one of a quantum dot and a quantum rod.

In an exemplary embodiment, the quantum dot or the quantum rod may include at least one of ZnS, ZnSe, ZnTe, CdS, CdSe, CdTe, HgS, HgSe, HgTe, PbS, PbSe, PbTe, AlN, AlP, AlAs, AlSb, GaN, GaAs, GaSb, InN, InP, InAs, InSb, InGaP and InZnP.

In an exemplary embodiment, the light absorbing layer may absorb a visible light.

In an exemplary embodiment, the light absorbing layer may include at least one metal of molybdenum (Mo), chromium (Cr), tungsten (W) and nickel (Ni).

According to another exemplary embodiment, a reflective liquid crystal display device includes a first substrate on which a plurality of pixel areas are defined, a second substrate facing the first substrate, a CLC layer between the first substrate and the second substrate, a polarization member on the second substrate, a retardation member between the polarization member and the CLC layer, a first light conversion member in a blue pixel area of the plurality of pixel areas, the first light conversion member excited by an incident light to emit a second blue light, a second light conversion member in a green pixel area of the plurality of pixel areas, the second light conversion member excited by the incident light to emit a green light, a third light conversion member in a red pixel area of the plurality of pixel areas, the third light conversion member excited by the incident light to emit a red light, and a dichroic reflective layer opposing the CLC layer with at least one of the first, second and third light conversion members interposed therebetween.

In an exemplary embodiment, the retardation member may be a quarter wave retardation plate.

In an exemplary embodiment, the first, second and third light conversion members may include at least one of a quantum dot and a quantum rod.

In an exemplary embodiment, the CLC layer may selectively reflect a first blue light having a wavelength range from about 400 nm to about 500 nm in a planar state.

In an exemplary embodiment, the dichroic reflective layer may reflect a blue light of the incident light and transmits a green light and a red light.

In an exemplary embodiment, the reflective liquid crystal display device may further include a light absorbing layer disposed in a pixel area including the second light conversion member and the third light conversion member to absorb a visible light. The dichroic reflective layer may be disposed in a pixel area including the first light conversion member.

In an exemplary embodiment, the reflective liquid crystal display device may further include a light absorbing layer facing the first, second and third light conversion members with the dichroic reflective layer interposed therebetween.

The foregoing is illustrative only and is not intended to be in any way limiting. In addition to the illustrative exemplary embodiments and features described above, further exemplary embodiments and features will become apparent by reference to the drawings and the following detailed description.

BRIEF DESCRIPTION OF THE DRAWINGS

A more complete appreciation of the invention will become more apparent by describing in detail exemplary embodiments thereof with reference to the accompanying drawings, in which.

DETAILED DESCRIPTION

Figure 1:
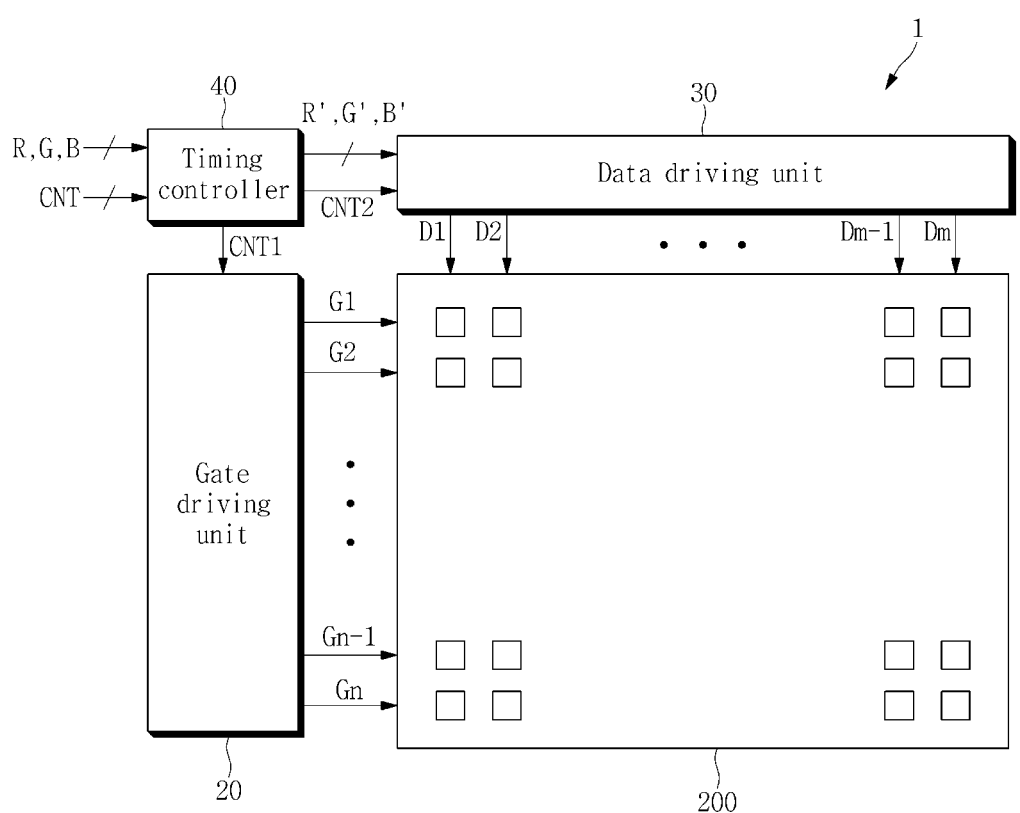
FIG. 1 is a plan view illustrating an exemplary embodiment of a liquid crystal display ("LCD") device.

Exemplary embodiments will now be described more fully hereinafter with reference to the accompanying drawings. Although the invention may be modified in various manners and have several exemplary embodiments, exemplary embodiments are illustrated in the accompanying drawings and will be mainly described in the specification. However, the scope of the invention is not limited to the exemplary embodiments and should be construed as including all the changes, equivalents and substitutions included in the spirit and scope of the invention.

In the drawings, thicknesses of a plurality of layers and areas are illustrated in an enlarged manner for clarity and ease of description thereof. When a layer, area, or plate is referred to as being "on" another layer, area, or plate, it may be directly on the other layer, area, or plate, or intervening layers, areas, or plates may be present therebetween. Conversely, when a layer, area, or plate is referred to as being "directly on" another layer, area, or plate, intervening layers, areas, or plates may be absent therebetween. Further when a layer, area, or plate is referred to as being "below" another layer, area, or plate, it may be directly below the other layer, area, or plate, or intervening layers, areas, or plates may be present therebetween. Conversely, when a layer, area, or plate is referred to as being "directly below" another layer, area, or plate, intervening layers, areas, or plates may be absent therebetween.

The spatially relative terms "below", "beneath", "less", "above", "upper" and the like, may be used herein for ease of description to describe the relations between one element or component and another element or component as illustrated in the drawings. It will be understood that the spatially relative terms are intended to encompass different orientations of the device in use or operation, in addition to the orientation depicted in the drawings. For example, in the case where a device illustrated in the drawing is turned over, the device positioned "below" or "beneath" another device may be placed "above" another device. Accordingly, the illustrative term "below" may include both the lower and upper positions. The device may also be oriented in the other direction and thus the spatially relative terms may be interpreted differently depending on the orientations.

Throughout the specification, when an element is referred to as being "connected" to another element, the element is "directly connected" to the other element, or "electrically connected" to the other element with one or more intervening elements interposed therebetween. It will be further understood that the terms "comprises," "including," "includes" and/or "including," when used in this specification, specify the presence of stated features, integers, steps, operations, elements and/or components, but do not preclude the presence or addition of one or more other features, integers, steps, operations, elements, components and/or groups thereof.

It will be understood that, although the terms "first," "second," "third," and the like may be used herein to describe various elements, these elements should not be limited by these terms. These terms are only used to distinguish one element from another element. Thus, "a first element" discussed below could be termed "a second element" or "a third element," and "a second element" and "a third element" may be termed likewise without departing from the teachings herein.

"About" or "approximately" as used herein is inclusive of the stated value and means within an acceptable range of deviation for the particular value as determined by one of ordinary skill in the art, considering the measurement in question and the error associated with measurement of the particular quantity (i.e., the limitations of the measurement system). For example, "about" may mean within one or more standard deviations, or within ±30%, 20%, 10%, 5% of the stated value.

Unless otherwise defined, all terms used herein (including technical and scientific terms) have the same meaning as commonly understood by those skilled in the art to which this invention pertains. It will be further understood that terms, such as those defined in commonly used dictionaries, should be interpreted as having a meaning that is consistent with their meaning in the context of the relevant art and will not be interpreted in an ideal or excessively formal sense unless clearly defined in the specification.

Some of the parts which are not associated with the description may not be provided in order to specifically describe embodiments of the invention and like reference numerals refer to like elements throughout the specification.

Herein, an externally incident light is referred to as a first light L1 and a light converted in terms of a wavelength in a light conversion member (e.g., light conversion layer) 250 to be emitted outwards is referred to as a second light L2. A blue light of the first light L1 is referred to as a first blue light B1, a red light of the first light L1 is referred to as a first red light R1 and a green light of the first light L1 is referred to as a first green light G1. In addition, a blue light of the second light L2 is referred to as a second blue light B2, a red light of the second light L2 is referred to as a second red light R2 and a green light of the second light L2 is referred to as a second green light G2.

Hereinafter, configurations and effects of the invention will be described in detail with reference to exemplary embodiments of the invention illustrated in the accompanying drawings.

FIG. 1 is a plan view illustrating a liquid crystal display ("LCD") device according to an exemplary embodiment.

Referring to FIG. 1, an LCD device 1 may include an LCD panel 200, a gate driving unit 20, a data driving unit 30 and a timing control unit 40.

A plurality of gate lines G1 to Gn and a plurality of data lines D1 to Dm crossing the plurality of gate lines G1 to Gn to define pixel areas may be provided in the LCD panel 200, where n and m are natural numbers.

Pixels of red R, green G and blue B may be disposed in the pixel area of the LCD panel 200. In an exemplary embodiment, the pixels may be arranged in a checkerboard form or may be arranged in a stripe form, for example.

The gate driving unit 20 generates a gate signal based on a gate control signal CNT1 provided from the timing controller 40 and sequentially applies the gate signal to the gate lines G1 to Gn of the LCD panel 200.

The data driving unit 30 generates a data signal voltage using a data control signal CNT2 provided from the timing controller 40 and image data R', G', B' and applies the data signal voltage to the plurality of data lines D1 to Dm of the LCD panel 200.

The timing controller 40 may generate the gate control signal CNT1 and the data control signal CNT2 for controlling the operations of the gate driving unit 20 and the data driving unit 30, respectively, based on a control signal CNT externally applied thereto, for example, a vertical synchronization signal, a horizontal synchronization signal, a clock signal, and a data enable signal. The gate control signal CNT1 and the data control signal CNT2 may be output to the gate driving unit 20 and the data driving unit 30, respectively.

Figure 2:
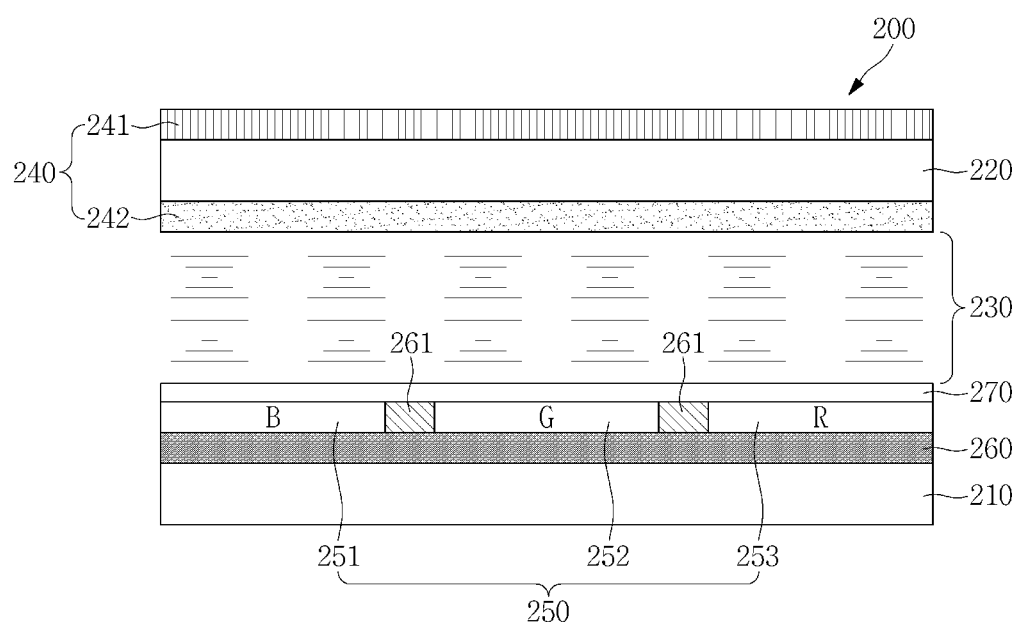
FIG. 2 is a cross-sectional view illustrating an LCD panel illustrated in FIG. 1.

FIG. 2 is a cross-sectional view illustrating the LCD panel 200 illustrated in FIG. 1.

Referring to FIG. 2, the LCD panel 200 includes a first substrate 210, a second substrate 220 opposing parallel to the first substrate 210 and a liquid crystal layer 230 between the first substrate 210 and the second substrate 220.

The first substrate 210 may include a plurality of pixel electrodes (not illustrated) and a plurality of thin film transistors ("TFTs") (not illustrated) electrically connected in one-to-one correspondence with the pixel electrodes. The data line is connected to a source electrode of the TFT, the gate line is connected to a gate electrode thereof, and the pixel electrode is connected to a drain electrode thereof. Each TFT switches a driving signal provided to each corresponding one of the pixel electrodes.

In addition, the second substrate 220 may include a common electrode (not illustrated) forming an electric field for controlling the alignment of liquid crystals together with the pixel electrodes. The LCD panel 200 controls an amount of transmitted light by driving the liquid crystal layer 230 to display an image.

The LCD panel 200 includes a driving chip (not illustrated) for providing a driving signal, a driving chip mounting film (not illustrated) on which the driving chip is disposed (e.g., mounted) and a printed circuit board (not illustrated) electrically connected to the LCD panel 200 through the driving chip mounting film. In an exemplary embodiment, the driving chip mounting film may be a tape carrier package ("TCP"), for example.

A polarization member 240 is disposed on the LCD panel 200 and includes a first polarization member 241 and a retardation member 242. The first polarization member 241 is disposed on a surface of the second substrate 220 that is opposite to a surface of the second substrate 220 facing the first substrate 210, and the retardation member 242 is disposed on the surface of the second substrate 220 facing the first substrate 210. The first polarization member 241 has linear polarization characteristics and the retardation member 242 has quarter wave phase retardation characteristics.

It is illustrated in FIG. 2 that the first polarization member 241 and the retardation member 242 oppose each other with the second substrate 220 interposed therebetween. However, exemplary embodiments are not limited thereto, and both of the first polarization member 241 and the retardation member 242 may be disposed on one surface of the second substrate 220, for example. The polarization member 240 is configured such that the first polarization member 241 and the retardation member 242 are sequentially disposed with respect to an incidence direction of an external light, regardless of on which surface of the second substrate 220 the polarization member 240 is disposed.

The liquid crystal layer 230 includes cholesteric liquid crystals ("CLCs").

The liquid crystals are generally divided into three types, e.g., a nematic type, a smectic type and a cholesteric type.

Among the three types, the CLC has a nematic liquid crystal phase having a spiral structure with a small amount of chiral dopants added thereto to have a one-dimensional photonic crystal structure. The CLCs may generally be classified into a planar alignment, a focal conic alignment and a homeotropic alignment. The CLCs have characteristics of selectively reflecting the external light according to the wavelength of the external light in a planar alignment state.

The light conversion member 250, disposed between the liquid crystal layer 230 and the first substrate 210, may absorb an incident light having a specific wavelength and convert the light into a light having a different wavelength to output the converted light. The light conversion member 250 includes a first light conversion member 251 for converting a blue light having a wavelength into a blue light having a different wavelength, a second light conversion member 252 for converting the blue light into a green light and a third light conversion member 253 for converting the blue light into a red light. The first, second and third light conversion members 251, 252 and 253 may be disposed corresponding to respective pixels displaying different colors, and may include different color conversion materials. A protective layer 270 may be disposed between the light conversion member 250 and the liquid crystal layer 230.

A light absorbing layer 260 is disposed between the light conversion member 250 and the first substrate 210 and absorbs an external light. The light absorbing layer 260 is disposed below the first, second and third light conversion members 251, 252 and 253 and may absorb and dissipate the first red light R1 and the first green light G1, except the first blue light B1 that is converted into a light of a different wavelength, among the first light L1 incident to the first, second and third light conversion members 251, 252 and 253. A part of the first blue light B1 that has not been converted by the light conversion member 250 may be absorbed by the light absorbing layer 260 and be dissipated. The light absorbing layer 260 may include a black pigment that absorbs visible light. Further, the light absorbing layer 260 may include at least one of metals such as molybdenum (Mo), chrome (Cr), tungsten (W) and nickel (Ni). The light absorbing layer 260 may have a single layer structure including a metal such as molybdenum (Mo), chrome (Cr), tungsten (W) or nickel (Ni) having a high light absorptivity or may have a multilayer stack structure including the metal layer and a transparent conductive oxide layer.

A black matrix 261 is disposed between the first, second and third light conversion members 251, 252 and 253 to partition the pixel area. The black matrix 261 substantially prevents the light conversion member 250 of a pixel in a peripheral portion from being excited by the second blue light B2 emitted from the first light conversion member 251 so that the color combination may not occur between the pixels. The black matrix 261 may include a substantially same material as that of the light absorbing layer 260. Further, the black matrix 261 and the light absorbing layer 260 may be unitary (e.g., in a monolithic structure). The light absorbing layer 260 and the black matrix 261 may be unitary by defining a groove in a part of the light absorbing layer 260 to accommodate the light conversion member 250.

Figure 3A:
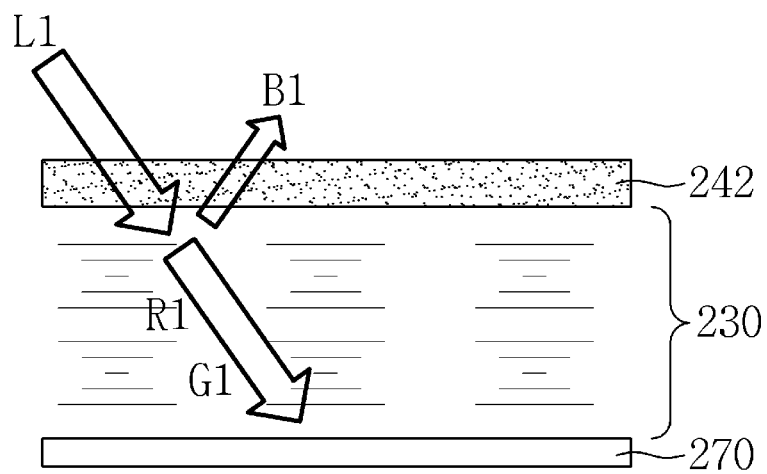
FIG. 3A is a diagram illustrating cholesteric liquid crystals ("CLCs") in a planar state.

FIG. 3A is a diagram illustrating CLCs in a planar state.

The CLCs are characterized by three states, e.g., a planar state, a focal conic state and a homeotropic state. These three states are switched by applying a voltage of a predetermined level or higher to the liquid crystal. When the liquid crystal enters a steady state after a phase transition, a voltage equal to, higher than or less than a threshold value of each phase should be applied thereto to be out of the state.

Referring to FIG. 3A, the CLC has characteristics that a reflectance varies depending on an alignment state of the liquid crystals in the planar state. Further, even at different reflectances, the CLC has characteristics of reflecting only a light of a specific wavelength. In an exemplary embodiment, the CLC has characteristics of reflecting a circularly polarized light in a substantially same direction as that of a twisted structure of the CLCs and transmitting a circularly polarized light in the opposite direction thereto in a planar state, for example. In such an exemplary embodiment, a wavelength λ of a reflected light is expressed as λ=n×p, which is a product of an average refractive index n of the liquid crystals and a pitch p of the CLCs. Accordingly, the wavelength of the selectively reflected light may be controlled by adjusting the pitch of the CLCs.

In an exemplary embodiment, the CLC layer 230 reflects the first blue light B1 having a wavelength in a range from about 400 nm to about 500 nm among the first lights L1, and for example, may have a maximum reflectance at a light wavelength band of about 450 nm. The first green light G1 and the first red light R1 pass through the liquid crystal layer 230 while the first blue light B1 is reflected from the liquid crystal layer 230.

Figure 3B:
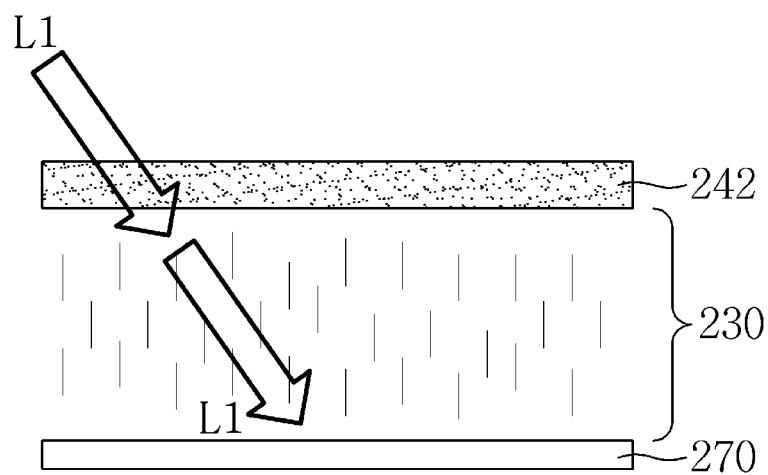
FIG. 3B is a diagram illustrating CLCs in a homeotropic state.

FIG. 3B is a diagram illustrating CLCs in the homeotropic state.

When a voltage higher than a threshold voltage is applied to the CLC layer 230 in the homeotropic state, the CLC layer 230 falls into the homotropic state. In the homeotropic state, liquid crystal molecules are aligned in a direction perpendicular to a plane of a substrate. The alignment of the liquid crystal molecules becomes a vertical direction and the first light L1 may pass through the liquid crystal layer 230.

Figure 3C:
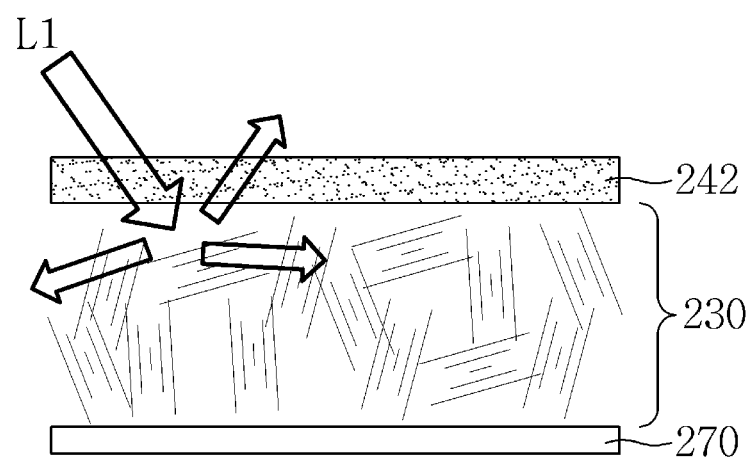
FIG. 3C is a diagram illustrating CLCs in a focal conic state.

FIG. 3C is a diagram illustrating CLCs in the focal conic state.

Referring to FIG. 3C, the liquid crystal alignment in the focal conic state arises when a high electric field applied to the liquid crystal in the homeotropic state is slowly lowered and the liquid crystals in the focal conic state have light scattering characteristics. The incident first light L1 is scattered at the liquid crystal layer 230 and may not pass through the liquid crystal layer 230.

When a higher voltage is applied to the CLCs in the focal conic state, the spiral structure is untwisted and the liquid crystals fall into a homeotropic state in which the liquid crystal molecules are aligned in a direction of an electric field. In such an exemplary embodiment, in the case where the electric field is gradually removed, the liquid crystals may return to the focal conic state, and in the case where the electric field is abruptly removed, the liquid crystals may fall into a planar state.

Figure 4:
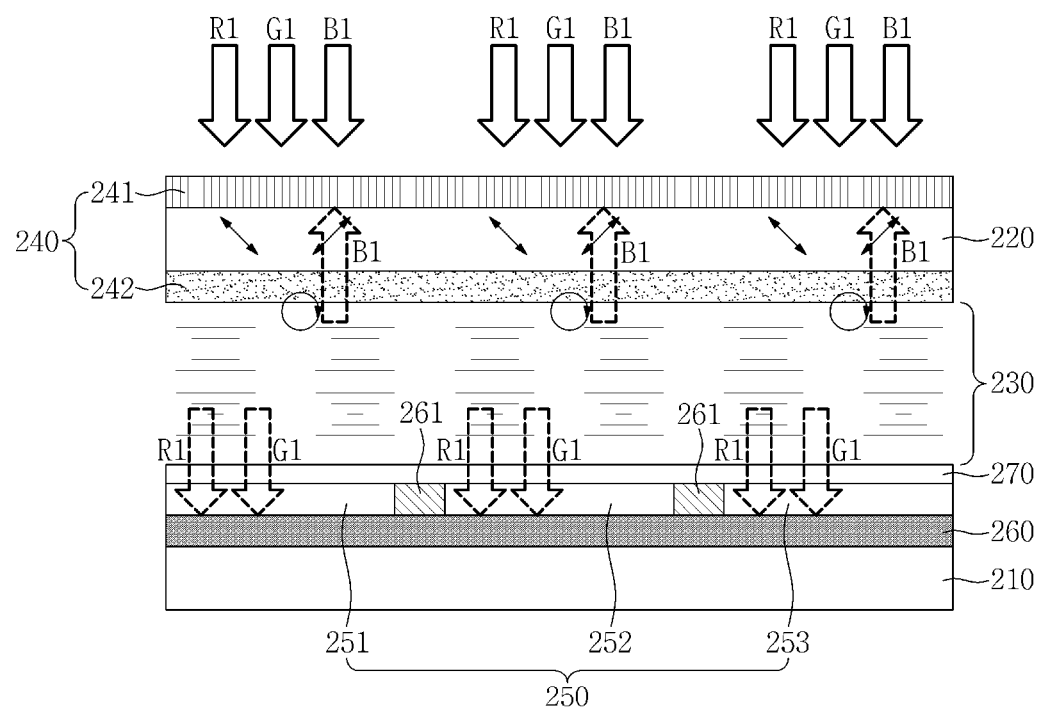
FIG. 4 is an explanatory view illustrating an exemplary embodiment of display of a black color in an LCD panel.

FIG. 4 is an explanatory view illustrating display of a black color in the LCD panel 200 according to an exemplary embodiment.

Referring to FIG. 4, the liquid crystal layer 230 of the LCD panel 200 is aligned in the planar state.

The first red light R1, the first green light G1 and the first blue light B1 of the first light L1 (refer to FIGS. 3A to 3C) are externally incident toward the second substrate 220 of the LCD panel 200. Each of the first red light R1, the first green light G1 and the first blue light B1 is linearly polarized in a first polarization axis while passing through the first polarization member 241. The first red light R1, the first green light G1 and the first blue light B1 that are linearly polarized are circularly polarized while passing through the quarter wave retardation member 242.

The CLC layer 230 is in the planar state and may selectively reflect a light of a specific wavelength. In an exemplary embodiment, the CLC layer according to an exemplary embodiment has a maximum reflection characteristic at about 450 nm and is configured to so as to reflect a light in a wavelength range from about 400 nm to about 500 nm, for example.

The first blue light B1 having a wavelength range from about 400 nm to about 500 nm among the first light L1 in the circularly polarized state that is incident to the CLC layer 230 is reflected from a surface of the CLC layer 230. The reflected first blue light B1 is linearly polarized while passing through the quarter wave retardation member 242 once again. While passing through the quarter wave retardation member 242 two times, a polarization axis of the first blue light B1 is changed to be substantially perpendicular to the first polarization axis. The first blue light B1 having passed through the quarter wave retardation member 242 is polarized in a direction substantially perpendicular to the first polarization axis of the first polarization member 241 and thus blocked by the first polarization member 241.

The first red light R1 and the first green light G1 having passed through the CLC layer 230 are incident to the light conversion member 250 on the first substrate 210. The light conversion member 250 is a light converting material including the first light conversion member 251 including blue quantum dots for converting the first blue light B1 in terms of wavelength into a blue light, the second light conversion member 252 including green quantum dots for converting the first blue light B1 into a green light, and the third light conversion member 253 including red quantum dots for converting the first blue light B1 into a red light. However, the light conversion member 250 is not limited thereto, and the light conversion member 250 may include at least one of a quantum dot and a quantum rod.

The first light conversion member 251 is disposed corresponding to a light emission area of a blue pixel, the second light conversion member 252 corresponding to a light emission area of a green pixel, and the third light conversion member 253 corresponding to a light emission area of a red pixel. In an exemplary embodiment, the quantum dots of the light conversion member 250 may be dispersed in an organic layer (not illustrated) or a polymer resin (not illustrated) and preferably have a thickness ranging from about 2 μm to about 5 μm, for example.

The quantum dots have a nanosize and have a discontinuous band gap structure like a single atom due to the quantum confinement effects. The quantum dots may adjust the interval of the discontinuous band gap according to the size of the quantum dots. Accordingly, when the quantum dots are synthesized so as to have a uniform size distribution, a light converter having a spectral distribution with a narrow half width may be provided. In an exemplary embodiment, as the size of the quantum dot increases, a light having a longer wavelength may be emitted, for example. Accordingly, the wavelength of the emitted light may be adjusted by adjusting the size of the quantum dots.

In an exemplary embodiment, the quantum dots may use group II-VI quantum dots such as ZnS, ZnSe, ZnTe, CdS, CdSe, CdTe, HgS, HgSe and HgTe, group III-V quantum dots such as PbS, PbSe, PbTe, AlN, AlP, AlAs, AlSb, GaN, GaAs, GaSb, InN, InP, InAs, InSb, InGaP and InZnP, or the like.

In an exemplary embodiment, the quantum dot may be selected from group II-VI compounds, group IV-VI compounds, group IV elements, group IV compounds and combinations thereof.

The group II-VI compound may include a double-element compound including CdSe, CdTe, ZnS, ZnSe, ZnTe, ZnO, HgS, HgSe, HgTe, MgSe, MgS and combinations thereof, a triple-element compound including CdSeTe, CdSTe, ZnSeS, ZnSeTe, ZnSTe, HgSeS, HgSeTe, HgSTe, CdZnS, CdZnSe, CdZnTe, CdHgS, CdHgSe, CdHgTe, HgZnS, HgZnSe, HgZnTe, MgZnSe, MgZnS and combinations thereof, and a quadra-element compound including HgZnTeS, CdZnSeS, CdZnSeTe, CdZnSTe, CdHgSeS, CdHgSeTe, CdHgSTe, HgZnSeS, HgZnSeTe, HgZnSTe and combinations thereof. The group III-V compound may include a double-element compound including GaN, GaP, GaAs, GaSb, AlN, AlP, AlAs, AlSb, InN, InP, InAs, InSb and combinations thereof, a triple-element compound including GaNP, GaNAs, GaNSb, GaPAs, GaPSb, AlNP, AlNAs, AlNSb, AlPAs, AlPSb, InNP, InNAs, InNSb, InPAs, InPSb, GaAlNP and combinations thereof, and a quadra-element compound including GaAlNAs, GaAlNSb, GaAlPAs, GaAlPSb, GaInNP, GaInNAs, GaInNSb, GaInPAs, GaInPSb, InAlNP, InAlNAs, InAlNSb, InAlPAs, InAlPSb and combinations thereof. The group IV-VI compound may include a double-element compound including SnS, SnSe, SnTe, PbS, PbSe, PbTe and combinations thereof, a triple-element compound including SnSeS, SnSeTe, SnSTe, PbSeS, PbSeTe, PbSTe, SnPbS, SnPbSe, SnPbTe and combinations thereof, and a quadra-element compound including SnPbSSe, SnPbSeTe, SnPbSTe and combinations thereof. The group IV element may include Si, Ge and combinations thereof. The IV group compound may include SiC, SiGe and combinations thereof.

Further, the quantum dot has a shape generally used in the art, and the shape of the quantum dot is not particularly limited. In an exemplary embodiment, it is desirable that the quantum dot have a shape of a sphere, a pyramid, multi arms, a cubic nanoparticle, a nanotube, a nanowire, a nanofiber, a nano-sized plate-shaped particle and the like, for example.

The light absorbing layer 260 is disposed below the first, second and third light conversion members 251, 252 and 253. The light absorbing layer 260 may be disposed over an entire surface of a light emission area of the first substrate 210 or may be patterned (not illustrated) corresponding to the first, second and third light conversion members 251, 252 and 253 positioned in the respective pixels.

The first red light R1 and the first green light G1 that do not react with the quantum dots may pass through the first, second and third light conversion members 251, 252 and 253. The first red light R1 and the first green light G1 transmitted through the first, second and third conversion members 251, 252 and 253 are absorbed by the light absorbing layer 260 and are not reflected outwards.

The entirety of the first red light R1, the first green light G1 and the first blue light B1 externally incident to the LCD panel 200 are not emitted outwards such that the LCD panel 200 may display a black color.

Figure 5A:
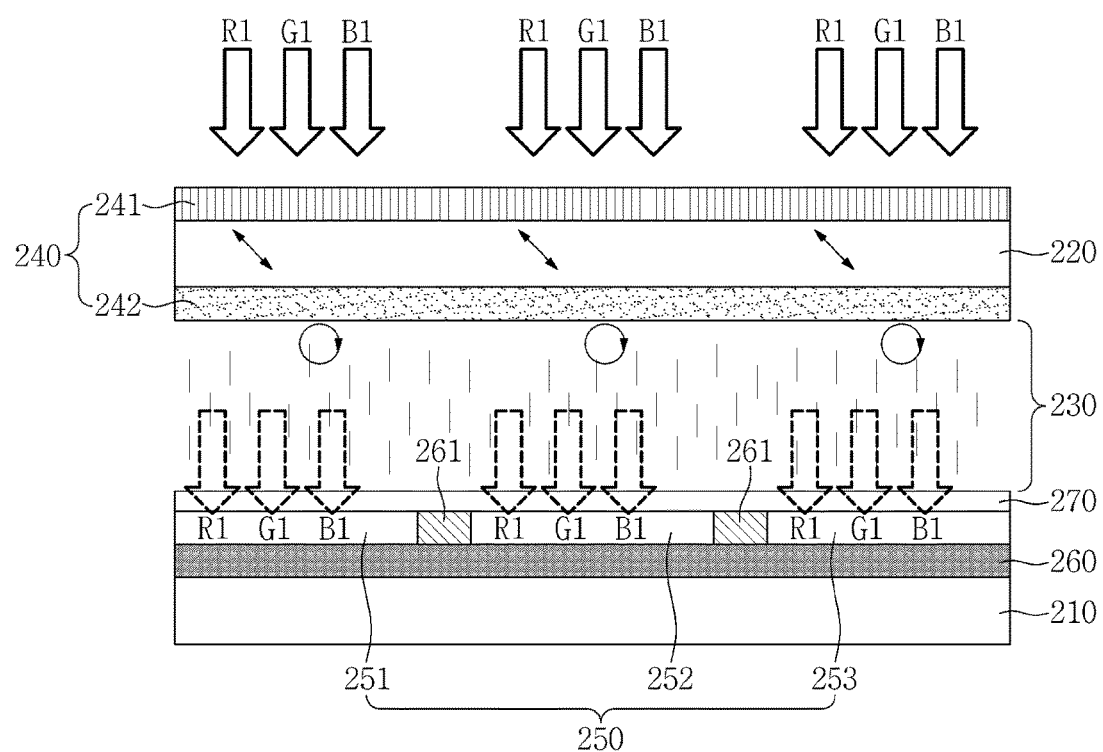
FIGS. 5A, 5B and 5C are explanatory views illustrating an exemplary embodiment of display of a white color in an LCD panel.
Figure 5B:
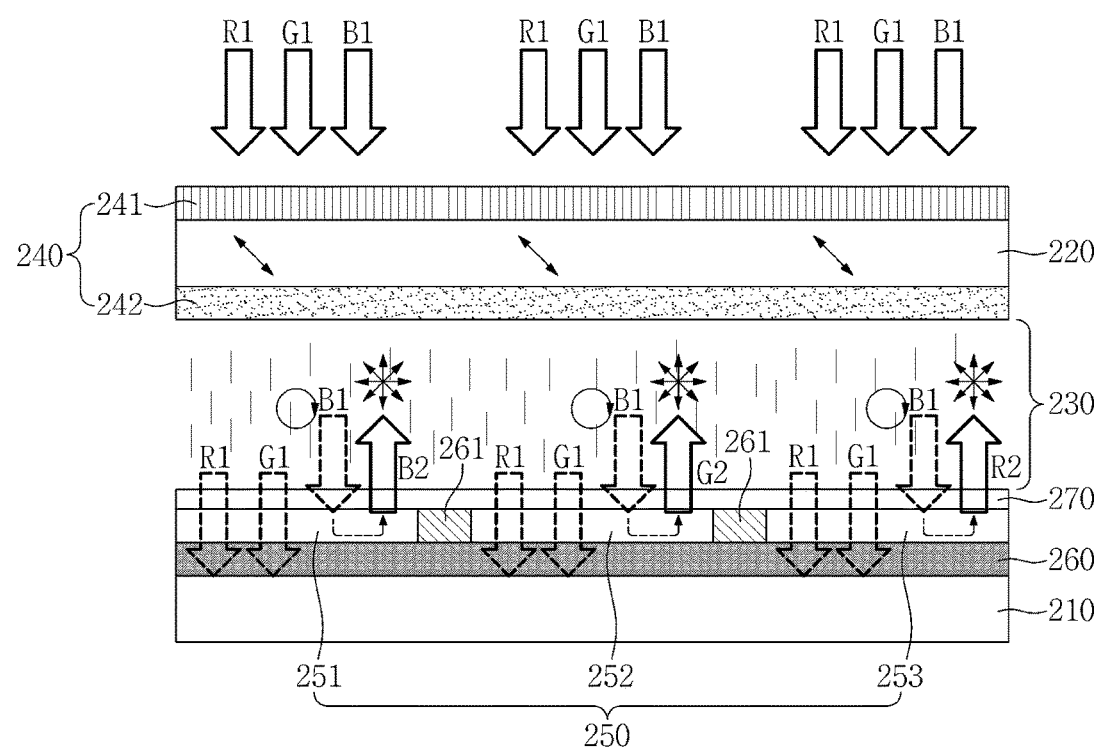
Figure 5C:
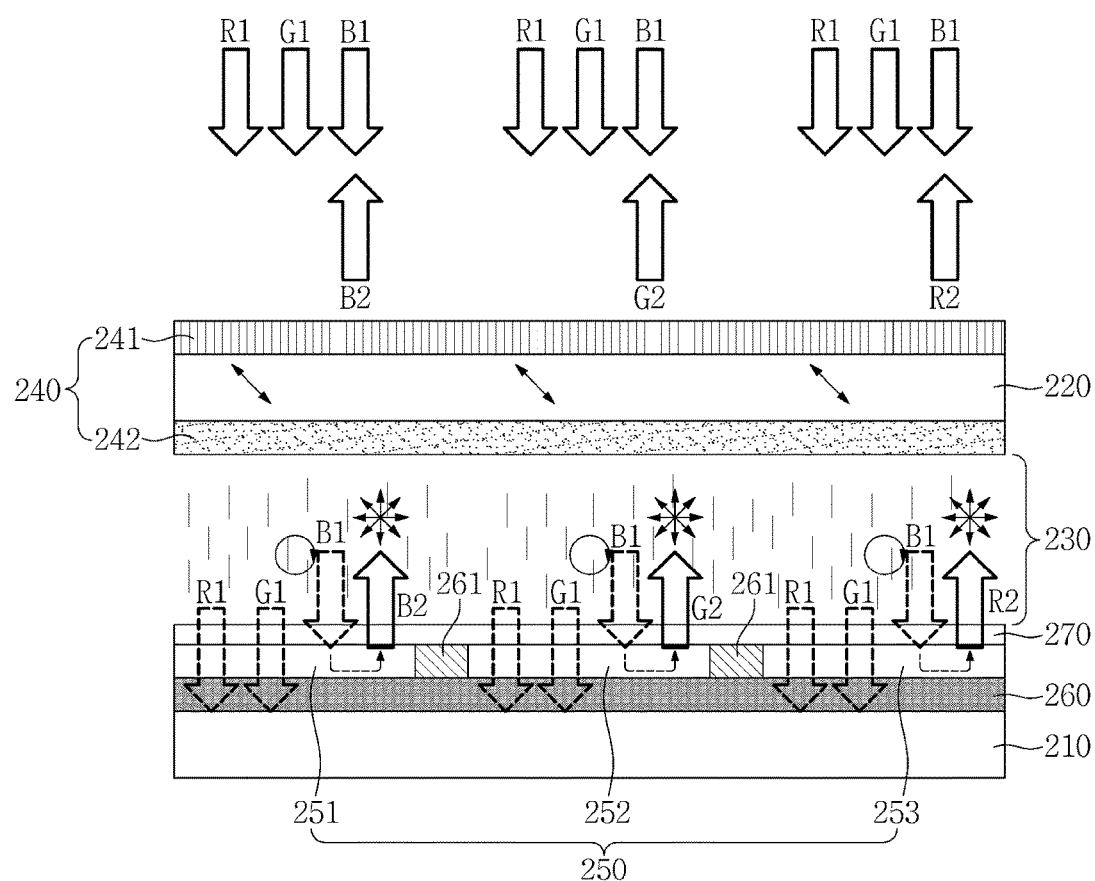

FIGS. 5A, 5B and 5C are explanatory views illustrating display of a white color in an LCD panel according to an exemplary embodiment.

Referring to FIG. 5A, the liquid crystal layer 230 of the LCD panel 200 is aligned in the homeotropic state.

The first red light R1, the first green light G1 and the first blue light B1 of the first light L1 (refer to FIGS. 3A to 3C) are externally incident toward the second substrate 220 of the LCD panel 200. The first red light R1, the first green light G1 and the first blue light B1 are linearly polarized in a first polarization axis while passing through the first polarization member 241. The first red light R1, the first green light G1 and the first blue light B1 that are linearly polarized are circularly polarized while passing through the quarter wave retardation member 242.

The CLC layer 230 is aligned in the homeotropic state so that the liquid crystal molecules are aligned in a direction perpendicular to a plane of the substrate. The first green light G1, the first red light R1 and the first blue light B1 pass through the CLC layer 230 without being reflected from the CLC layer 230 due to the liquid crystal molecules aligned in a vertical direction.

The first green light G1, the first red light R1 and the first blue light B1 transmitted through the CLC layer 230 are incident to the first, second and third light conversion members 251, 252 and 253 on the first substrate.

Referring to FIG. 5B, the first green light G1 and the first red light R1 incident to the first, second and third light conversion members 251, 252 and 253 on respective pixels pass through the first, second and third light conversion members 251, 252 and 253 to be absorbed in the light absorbing layer 260.

The first blue light B1 incident to the first light conversion member 251 is emitted as a second blue light B2 having a different wavelength from a wavelength of the first blue light B1. The first blue light B1 incident to the second light conversion member 252 is emitted as a second green light G2 having a green light wavelength. The first blue light B1 incident to the third light conversion member 253 is emitted as a second red light R2 having a red light wavelength.

The second blue light B2, the second green light G2 and the second red light R2 are output from the quantum dots of the light conversion member and emitted in a state of not being polarized.

Referring to FIG. 5C, the second blue light B2, the second green light G2 and the second red light R2 output from the light conversion member 250 pass through the CLC layer 230 and the quarter wave retardation member 242. In addition, the second green light G2, the second red light R2 and the second blue light B2 are a light converted by the quantum dots which is not polarized, and are polarized by the first polarization member 241 to be output to the outside of the LCD panel 200.

In addition, since the second green light G2, the second red light R2 and the second blue light B2 are emitted in a Lambertian form without being affected by an incidence angle of the incident first blue light B1, a wide viewing angle may be provided without being influenced by the angle of the external light.

The first red light R1 and first green light G1 are absorbed by the light absorbing layer 260 located on a rear surface of the first, second and third light conversion members 251, 252 and 253 and are not reflected outwards. The light absorbing layer 260 is a material that does not reflect visible light and absorbs the visible light. In an exemplary embodiment, the light absorbing layer 260 may have a single layer structure including a material that does not reflect the visible light and absorbs the visible light, e.g., at least one of an organic material including a black pigment or a metal such as molybdenum (Mo), chrome (Cr), tungsten (W) or nickel (Ni) having a high light absorptivity, or may have a multilayer stack structure including the metal layer and a transparent conductive oxide layer.

Figure 6:
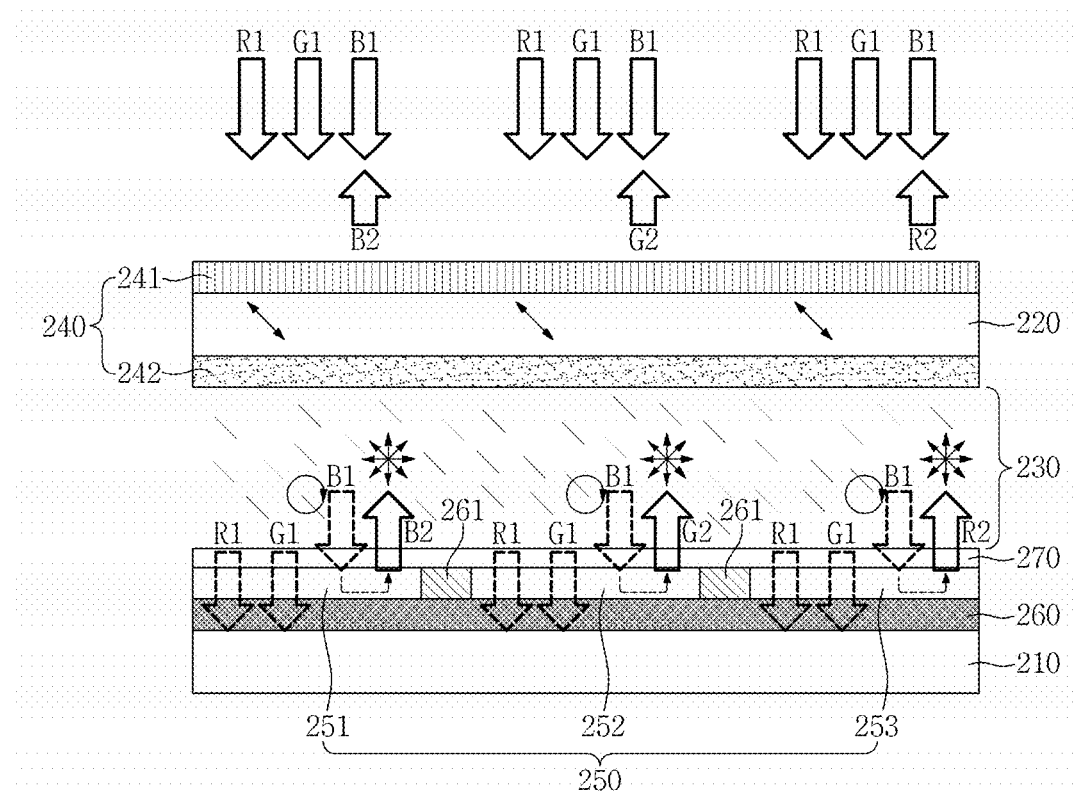
FIG. 6 is an explanatory view illustrating an exemplary embodiment of gray scale display in an LCD panel.

FIG. 6 is an explanatory view illustrating gray scale display in an LCD panel according to an exemplary embodiment.

Referring to FIG. 6, the CLC layer 230 has a state in which the alignment of liquid crystal molecules is inclined at a predetermined angle, having an intermediate phase between the planar state and the homeotropic state. A part of the first blue light B1 incident along the slope of the liquid crystal molecules is reflected from a surface of the liquid crystal layer 230 and another part of the first blue light B1 passes through the liquid crystal layer 230 to be incident to the light conversion member 250. The first blue light B1 excites a green quantum dot, a red quantum dot and a blue quantum dot to be converted into the second blue light B2, the second green light G2 and the second red light R2, respectively.

The slope of the alignment of the liquid crystal molecules may be controlled by adjusting a voltage applied to the liquid crystal molecules by controlling driving elements provided for each pixel. When an amount of the first blue light B1 passing through the liquid crystal layer 230 is controlled by adjusting the slope of the liquid crystal molecules for each pixel, an amount of the light output from the first, second and third light conversion members 251, 252 and 253 provided in respective pixels may be adjusted. The first green light G1 and the first red light R1 pass through the first, second and third light conversion members 251, 252 and 253 to be absorbed and dissipated in the light absorbing layer 260.

Figure 7:
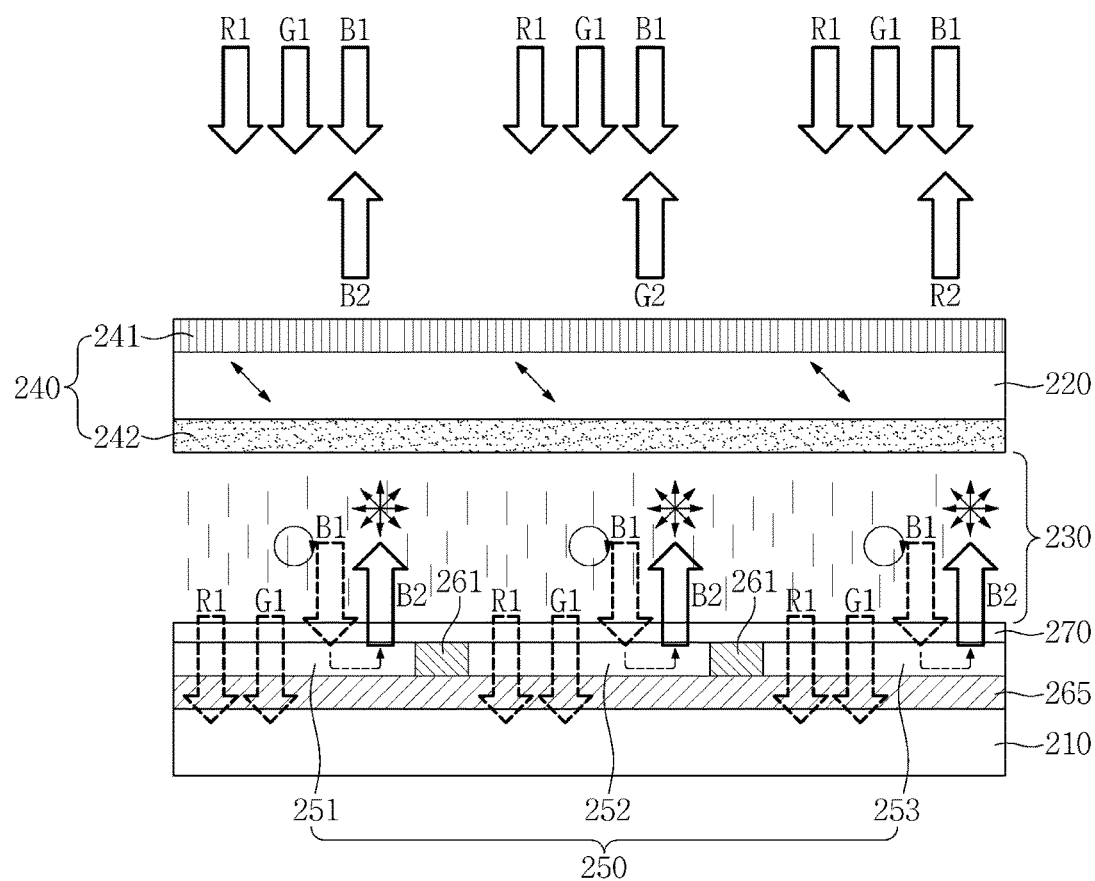
FIG. 7 is a cross-sectional view illustrating an alternative exemplary embodiment of an LCD panel.

FIG. 7 is a cross-sectional view illustrating an LCD panel according to an alternative exemplary embodiment.

Referring to FIG. 7, the LCD panel 200 may include a dichroic reflective layer 265 below the first, second and third light conversion members 251, 252 and 253.

The term "dichroic" in the dichroic reflective layer 265 means selectively reflecting a light in a first wavelength band and selectively transmitting a light in a second wavelength band to reflect only a part of an incident light.

The dichroic reflective layer 265 may be disposed over an entire surface of a display area of the first substrate or may be patterned corresponding to the first, second and third light conversion members 251, 252 and 253 corresponding to the respective pixels.

The dichroic reflective layer 265 according to an exemplary embodiment reflects the first blue light B1 among the first green light G1, the first red light R1 and the first blue light B1 that are incident thereto, and transmits the first green light G1 and the first red light R1 toward the first substrate.

The dichroic reflective layer 265 may improve the light conversion efficiency of the light conversion member 250 by re-reflecting the first blue light B1 that has not been converted in the light conversion member 250 and has been transmitted through the light conversion member 250 toward the light conversion member 250. In addition, since the first green light G1 and the first red light R1 may be transmitted toward the first substrate without being reflected, a contrast ratio of the LCD panel 200 may be improved.

According to an exemplary embodiment, it is illustrated by way of example that the dichroic reflective layer 265 reflects the first blue light B1. However, exemplary embodiments are not limited thereto and the dichroic reflective layer 265 may reflect a light of a wavelength band that may excite the light conversion member 250. In an exemplary embodiment, in the case where the light conversion member 250 is excited by a red light or a green light, the dichroic reflective layer 265 may reflect a light having a red light wavelength or a green light wavelength, for example.

Figure 8:
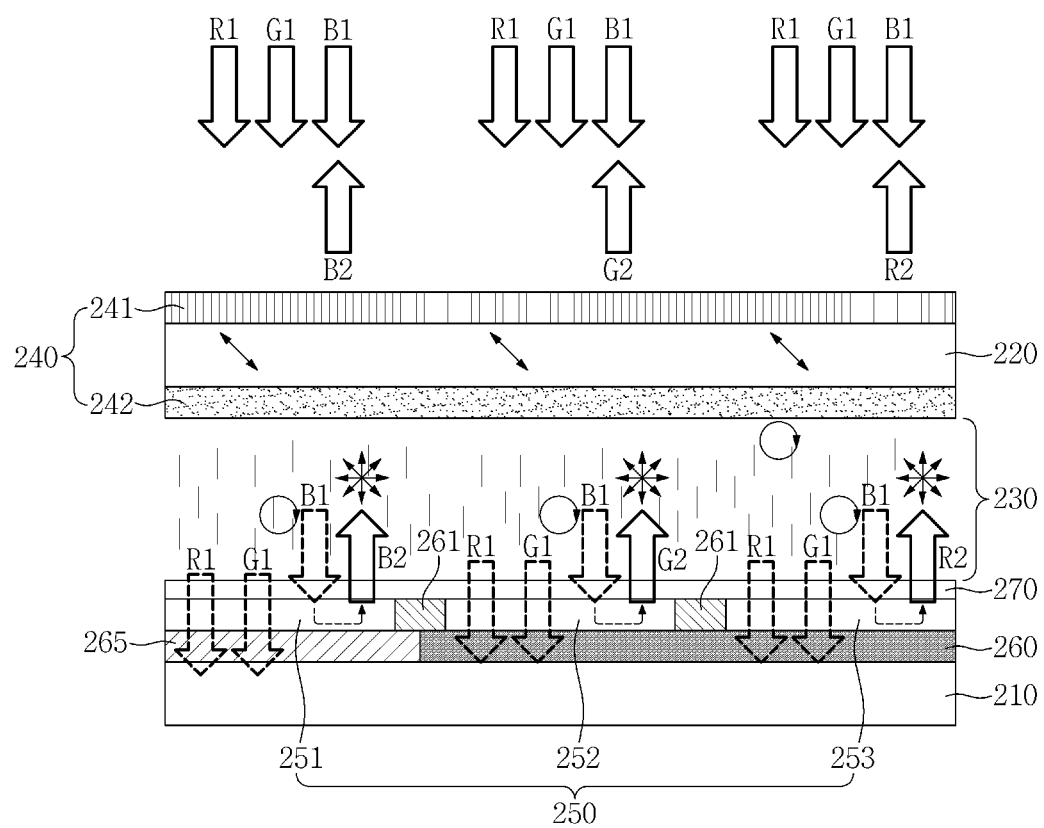
FIG. 8 is a cross-sectional view illustrating another alternative exemplary embodiment of an LCD panel.

FIG. 8 is a cross-sectional view illustrating an LCD panel according to another alternative exemplary embodiment.

Referring to FIG. 8, the LCD panel 200 (refer to FIGS. 1 and 2) may include a dichroic reflective layer 265 and a light absorbing layer 260 which are disposed below a light conversion member 250. The dichroic reflective layer 265 and the light absorbing layer 260 may be selectively disposed according to a converted light of the light conversion member 250.

The dichroic reflective layer 265 is disposed below a first light conversion member 251. The dichroic reflective layer 265 reflects a first blue light B1 among a first green light G1, a first red light R1 and the first blue light B1 incident thereto, and transmits the first green light G1 and the first red light R1 toward a first substrate.

The light absorbing layer 260 is disposed below second and third light conversion members 252 and 253 and has a characteristic of absorbing visible light. The second light conversion member 252 converts the first blue light B1 among the first green light G1, the first red light R1 and the first blue light B1 to output a second green light G2. The first green light G1 and the first red light R1 pass through the second light conversion member 252 to be absorbed and dissipated in the light absorbing layer 260. The third light conversion member 253 converts the first blue light B1 among the first green light G1, the first red light R1 and the first blue light B1 to output a second red light R2. The first green light G1 and the first red light R1 pass through the third light conversion member 253 to be absorbed and dissipated in the light absorbing layer 260.

Figure 9:
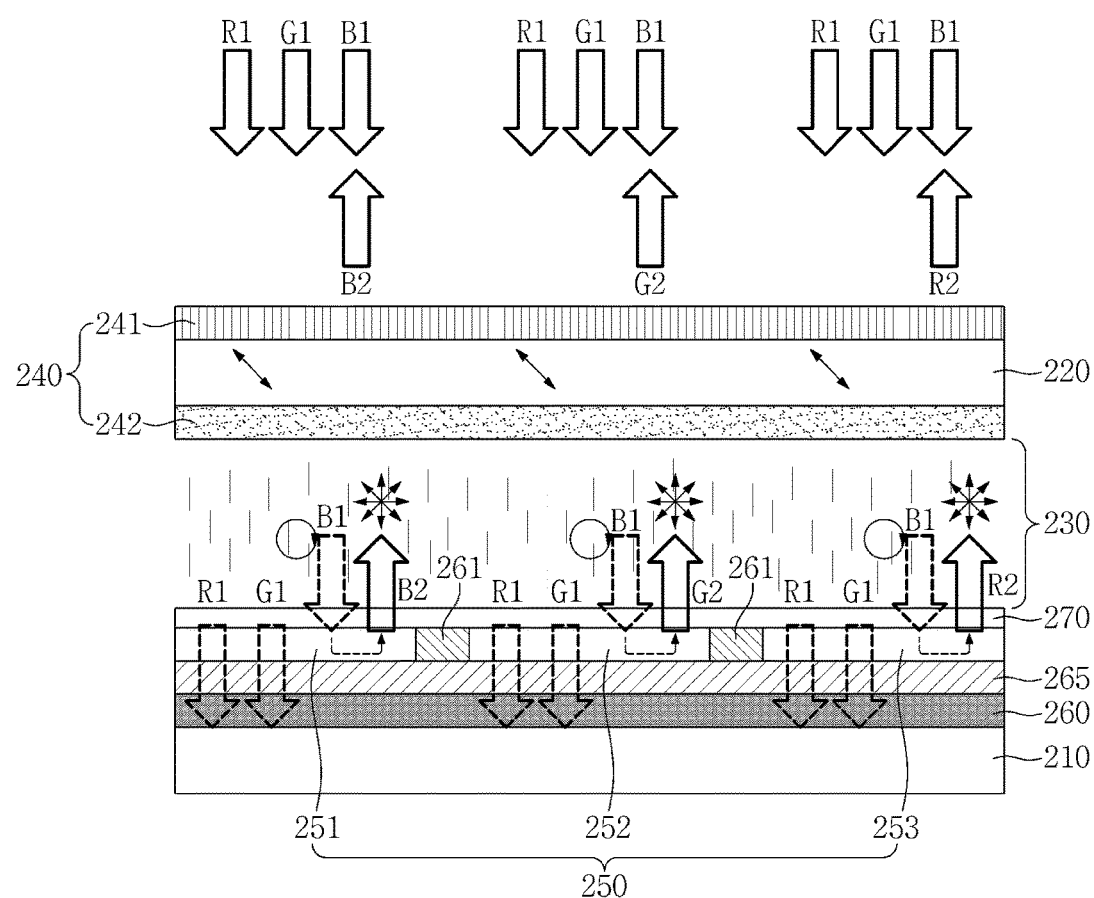
FIG. 9 is a cross-sectional view illustrating another alternative exemplary embodiment of an LCD panel.

FIG. 9 is a cross-sectional view illustrating an LCD panel according to still another alternative exemplary embodiment.

Referring to FIG. 9, the LCD panel 200 (refer to FIGS. 1 and 2) may include a dichroic reflective layer 265 and a light absorbing layer 260 which are disposed below a light conversion member 250.

The dichroic reflective layer 265 reflects a first blue light B1 among a first green light G1, a first red light R1 and the first blue light B1 incident thereto, and transmits the first green light G1 and the first red light R1 toward a first substrate.

The light absorbing layer 260 below the dichroic reflective layer 265 substantially prevents the first green light G1 and the first red light R1 transmitted through the dichroic reflective layer 265 from being reflected from a first substrate 210 and emitted outwards.

The dichroic reflective layer 265 and the light absorbing layer 260 are disposed below first, second and third light conversion members 251, 252 and 253. The dichroic reflective layer 265 and the light absorbing layer 260 may be disposed over an entire surface of a light emission area of the first substrate 210, or may be patterned (not illustrated)

corresponding to the first, second and third light conversion members 251, 252 and 253 corresponding to respective pixels.

As set forth hereinabove, according to one or more exemplary embodiments, the reflective LCD device is excellent in color expression outdoors and provides consistent visibility even when an angle of external light varies by including a light conversion member that is excited by a blue light included in an external light to emit a blue light, a green light and a red light and a light absorbing layer disposed below the light conversion member to absorb an external light.

While the invention has been illustrated and described with reference to the exemplary embodiments thereof, it will be apparent to those of ordinary skill in the art that various changes in form and detail may be formed thereto without departing from the spirit and scope of the invention.

What is claimed is:

1. A reflective liquid crystal display device comprising:
    a first substrate on which a plurality of pixel areas are defined;
    a second substrate facing the first substrate;
    a cholesteric liquid crystal layer between the first substrate and the second substrate;
    a linear polarization member on the second substrate;
    a retardation member between the linear polarization member and the cholesteric liquid crystal layer;
    a light absorbing layer on the first substrate; and a light conversion member corresponding to a pixel area of the plurality of pixel areas and interposed between the cholesteric liquid crystal layer and the light absorbing layer,
    wherein the light conversion member comprises at least one of a quantum dot and a quantum rod.

2. The reflective liquid crystal display device as claimed in claim 1, wherein the retardation member is a quarter wave retardation plate.

3. The reflective liquid crystal display device as claimed in claim 2, wherein the cholesteric liquid crystal layer selectively reflects a first blue light having a wavelength range from about 400 nanometers to about 500 nanometers in a planar state.

4. The reflective liquid crystal display device as claimed in claim 2, wherein the cholesteric liquid crystal layer transmits a first blue light having a wavelength range from about 400 nanometers to about 500 nanometers, a first green light having a wavelength range from about 500 nanometers to about 570 nanometers and a first red light having a wavelength range from about 620 nanometers to about 750 nanometers which are incident thereto in a homeotropic state, and
    the light conversion member comprises:
    a first light conversion member in a blue pixel area of the plurality of pixel areas, the first light conversion member excited by the first blue light to emit a second blue light;
    a second light conversion member in a green pixel area of the plurality of pixel areas, the second light conversion member excited by the first blue light to emit a second green light; and
    a third light conversion member in a red pixel area of the plurality of pixel areas, the third light conversion member excited by the first blue light to emit a second red light.

5. The reflective liquid crystal display device as claimed in claim 1, wherein the quantum dot or the quantum rod comprise at least one of ZnS, ZnSe, ZnTe, CdS, CdSe, CdTe, HgS, HgSe, HgTe, PbS, PbSe, PbTe, AlN, AlP, AlAs, AlSb, GaN, GaAs, GaSb, InN, InP, InAs, InSb, InGaP and InZnP.

6. The reflective liquid crystal display device as claimed in claim 1, wherein the light absorbing layer absorbs a visible light.

7. The reflective liquid crystal display device as claimed in claim 6, wherein the light absorbing layer comprises at least one metal of molybdenum (Mo), chromium (Cr), tungsten (W) and nickel (Ni).

8. The reflective liquid crystal display device as claimed in claim 1, wherein the light conversion member is interposed between the cholesteric liquid crystal layer and the light absorbing layer in a vertical direction from the first substrate toward the second substrate.

9. The reflective liquid crystal display device as claimed in claim 1, wherein the light absorbing is disposed on as entire surface of a light emission of the first substrate.

10. A reflective liquid crystal display device comprising:
    a first substrate on which a plurality of pixel areas are defined;
    a second substrate facing the first substrate;
    a cholesteric liquid crystal layer between the first substrate and the second substrate;
    a polarization member on the second substrate;
    a retardation member between the polarization member and the cholesteric liquid crystal layer;
    a first light conversion member in a blue pixel area of the plurality of pixel areas, the first light conversion member excited by an incident light to emit a second blue light;
    a second light conversion member in a green pixel area of the plurality of pixel areas, the second light conversion member excited by the incident light to emit a green light;
    a third light conversion member in a red pixel area of the plurality of pixel areas, the third light conversion member excited by the incident light to emit a red light; and
    a dichroic reflective layer opposing the cholesteric liquid crystal layer with at least one of the first, second and third light conversion members interposed therebetween.

11. The reflective liquid crystal display device as claimed in claim 10, wherein the retardation member is a quarter wave retardation plate.

12. The reflective liquid crystal display device as claimed in claim 11, wherein the first, second and third light conversion members comprise at least one of a quantum dot and a quantum rod.

13. The reflective liquid crystal display device as claimed in claim 11, wherein the cholesteric liquid crystal layer selectively reflects a first blue light having a wavelength range from about 400 nanometers to about 500 nanometers in a planar state.

14. The reflective liquid crystal display device as claimed in claim 13, wherein the dichroic reflective layer reflects a blue light of the incident light and transmits a green light and a red light.

15. The reflective liquid crystal display device as claimed in claim 14, further comprising a light absorbing layer disposed in a pixel area of the plurality of pixel areas comprising the second light conversion member and the third light conversion member to absorb a visible light, wherein the dichroic reflective layer is disposed in a pixel area of the plurality of pixel areas comprising the first light conversion member.

16. The reflective liquid crystal display device as claimed in claim 14, further comprising a light absorbing layer facing the first, second and third light conversion members with the dichroic reflective layer interposed therebetween.

\* \* \* \* \*